Dec. 12, 1933.                    C. KACHEL                    1,938,702
                        METHOD OF MAKING AXLE HOUSINGS
                            Filed April 26, 1932
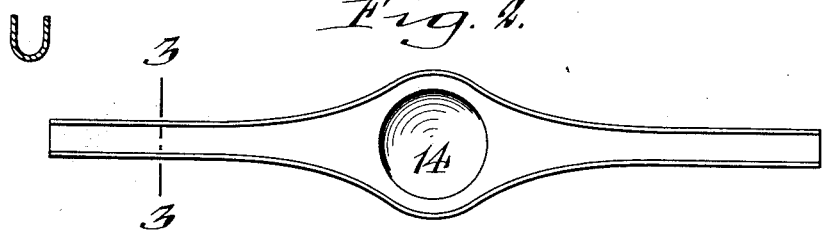
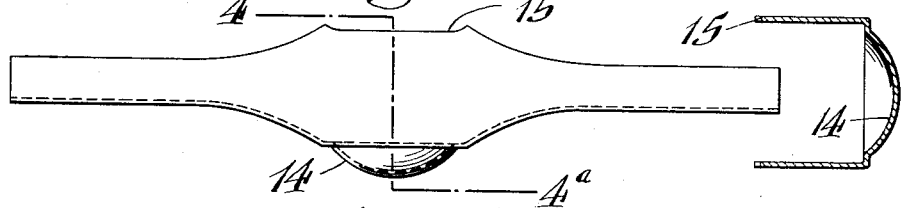
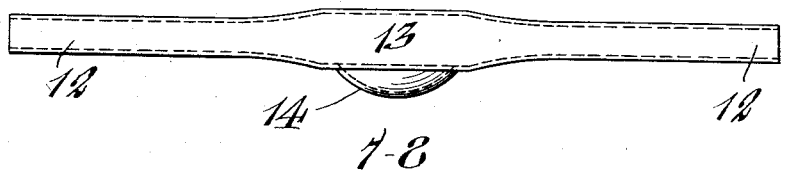
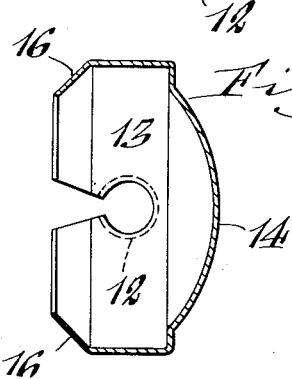
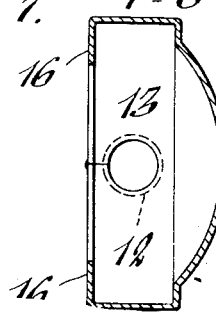
Inventor,
Charles Kachel
by Walter P. Geyer
Attorney.

Patented Dec. 12, 1933

1,938,702

UNITED STATES PATENT OFFICE 1,938,702

METHOD OF MAKING AXLE HOUSINGS

Charles Kachel, Buffalo, N. Y.

Application April 26, 1932. Serial No. 607,575

2 Claims. (Cl. 29—153.1)

This invention relates to automobile axle housings and particularly to a novel method of making the same.

Its chief object is the production of a complete rear axle and differential housing out of a single blank of material and wherein the method involves the integral formation of the cover with the differential casing of the housing.

Another object of the invention is to provide a rear axle housing by a simple and inexpensive method of manufacture and by a minimum number of stamping operations.

In the accompanying drawing:—Figure 1 is a plan view of the blank from which the axle housing and differential casing is formed. Figure 2 is a side view of the blank after the first step in the forming and bending operations are performed. Figure 3 is a cross section taken on line 3—3, Figure 2. Figure 4 is a top plan view of the housing shown in Figure 2. Figure 4a is a cross section on line 4a—4a, Figure 4. Figure 5 is a top plan view of the finished housing. Figure 6 is a rear view of the finished housing. Figures 7 and 8 are enlarged cross sections taken in the plane of the correspondingly numbered line of Figure 6 and showing the relation of the parts before and after the closing in and welding operations, respectively.

Similar characters of reference indicate corresponding parts throughout the several views.

In manufacturing my improved axle housing and differential casing as a unitary structure, the steps of which are shown in the drawing, I employ a flat sheet of metal cut into substantially the shape shown in Figure 1, such sheet being drawn or shaped in a press by means of suitable dies to form the finished product as shown in Figures 5, 6 and 8, wherein the cover of the differential casing is made integrally with one side thereof and wherein an opening is provided in its opposite side for receiving the propeller shaft and its customary bearing sleeve.

The sheet metal blank consists of a substantially circular central portion 10 and oppositely extending substantially rectangular portions or arms 11. The latter, when properly formed, produce the tubular housings 12 for receiving the axle sections, while the circular central portion, when properly shaped, constitutes the casing 13 for receiving the differential assembly of the motor vehicle. At the junction of the arms 11 with the circular portion 10 sufficient stock is provided to afford a gradual taper between these parts in the finished housing.

The first step in the manufacture of the housing is to form the blank into a channel or U shape, as shown in Figures 2 and 3, which is a press operation to not only partially shape the arms 11 into a semi-tubular form and the central portion 10 into a substantially rectangular form in cross section, as seen in Figures 3 and 4a, respectively, but to also provide in the bottom or connecting web thereof a substantially dish-shaped portion 14 which forms an integral cover for the differential casing. The next operation is that of trimming the free edges 15 of the central portion to the required size for forming the open front end of the casing into which the propeller shaft assembly projects. The next press operation is that of bending or folding inwardly the marginal edges 16 of the rectangular differential casing of the housing to a substantially 45 degree angle, as shown in Figure 7, and then closing in these marginal edges to a substantially vertical position, as seen in Figure 8. Simultaneously with this last operation, the circular formation of the axle housings 12 are effected and finally the resulting horizontal joint is welded or otherwise permanently joined.

In making an axle housing by this method, the number of press operations required is not only materially reduced over present day methods, but a material saving in time and expense is also afforded. In addition to these advantages, the integral formation of the cover with the axle housing eliminates the necessity of providing a separate cover together with the necessary drilling and tapping operations required for attaching the cover to the housing, and as a whole this method makes it possible to manufacture axle housings at a considerably lower figure than the methods now employed. Furthermore, by dispensing with a separate cover and the resulting joint between the cover and the housing, danger of oil leakage from the differential housing is positively eliminated.

I claim as my invention:—

1. The method of making axle housings, which consists in forming a blank into an enlarged central portion and arms extending oppositely therefrom, bending such blank into substantially channel shape and forming the central portion thereof into a dish-shaped wall, and then bending the channel-shaped blank into tubular axle receiving members and a hollow differential casing, the dish-shaped wall of said central portion of the blank constituting an integral cover for the differential casing.

2. The method of making axle housings, which consists in forming a blank into an enlarged central portion for the differential casing and arms extending oppositely therefrom for the axle-receiving members, bending such blank into substantially channel shape and forming in the connecting web of the enlarged central portion an outwardly dished section constituting an integral cover for the differential casing, and then closing in the free ends of the channel to complete the axle-receiving members and the differential casing.

CHARLES KACHEL.